United States Patent [19]
Kackley

[11] 3,814,491
[45] June 4, 1974

[54] SNAP IN CONNECTOR

[75] Inventor: William Gene Kackley, Webster City, Iowa

[73] Assignee: Franklin Manufacturing Company, St. Cloud, Minn.

[22] Filed: Sept. 7, 1972

[21] Appl. No.: 286,878

[52] U.S. Cl.............. 312/257 R, 24/224, 403/353
[51] Int. Cl........................................... A47b 47/00
[58] Field of Search .. 24/224; 312/228, 229, 257 R; 403/353

[56] References Cited
UNITED STATES PATENTS

| 2,621,357 | 12/1952 | Stuman | 403/353 X |
| 3,253,874 | 5/1966 | Czech | 312/228 |
| 3,331,226 | 7/1967 | Fink | 312/198 |
| 3,491,820 | 1/1970 | Ostling | 52/756 X |

FOREIGN PATENTS OR APPLICATIONS

| 242,757 | 11/1925 | Great Britain | 24/224 R |
| 637,519 | 3/1962 | Canada | 24/224 BW |
| 445,918 | 4/1936 | Great Britain | 24/224 BW |

*Primary Examiner*—James T. McCall
*Assistant Examiner*—William E. Lyddane
*Attorney, Agent, or Firm*—McNenny, Farrington, Pearne & Gordon

[57] ABSTRACT

A connector arrangement for releasably joining a pair of members such as the component panels of a laundry appliance comprising grippers projecting from one component panel and elements on the other component panel adapted to cooperate with the grippers to resist forces between the components across the plane separating them. A self-engaging latch responsive to movement relative to one of the component panels is provided to automatically lock the panels together by preventing disengagement between the grippers and the cooperating elements and thereby complete the assembly of the panels with a minimum of effort. The latch includes a release tab which may be manually engaged by a suitable tool to permit separation of the panels.

10 Claims, 5 Drawing Figures

PATENTED JUN 4 1974　　　　　　　　　　　　　　　3,814,491

SNAP IN CONNECTOR

BACKGROUND OF THE INVENTION

The invention relates to improvements in mechanical connectors and, more particularly, pertains to self-locking connectors for joining panels and the like.

DESCRIPTION OF THE PRIOR ART

A variety of arrangements have been proposed for releasably connecting panels and like members together. The more specialized of these arrangements have included, for example, interfitting clips, projections, grooves and/or recesses provided on the members to be joined. Even though its has been generally intended to simplify assembly procedures with such arrangements, a series of steps has usually been required to complete a panel connection. After initially positioning and interfitting various elements, additional effort is normally required to finally secure and lock the members together. The most common of these final locking steps has been the use of threaded fasteners to prevent the members from uncoupling themselves. Rotary movement required by threaded fasteners such as screws or nuts adds to assembly time and cost. Where threaded fasteners or other loose elements are avoided, special connectors usually require some additional manual effort for finally locking the members together besides that required for initial alignment and positioning of the members.

A simplified means of connecting and positively locking panels is particularly desirable in mass production applications where assembly time is a major cost factor. One product of mass production in which panel connections must be made under current assembly practices is that of laundry appliances. Appliances, such as domestic washers and dryers, usually include a cabinet base and a separate control console. It is important that the panels forming these components be secured together with a minimum of manual effort. It is equally important that the means connecting the panels be releasable and reuseable to permit future service of the appliance.

SUMMARY OF THE INVENTION

The invention provides releasable connector means for joining members such as panels together with a minimum of assembly effort. The connector means includes gripper means extending from one member or component to the other across a plane separating the members. Means are provided on the other member to cooperate with the gripper means to resist forces separating the members and locking means are provided to prevent disengagement of the gripping and cooperating means. The locking means includes a self-operating latch responsive to relative movement between one of the members parallel to the plane of separation for automatically locking the members together. The self-engaging latch avoids the use of separate or loose fasteners and the effort normally required to position and secure such fasteners.

In the preferred embodiment of the invention, the connector means is employed to fasten the component panels of a cabinet base and a control console in a laundry appliance. The gripper means are provided in the form of shoulder screws secured to one of the components. The heads of the screws are spaced a predetermined distance from the plane of the one component so that they are adapted to extend into the other component when the components are brought together. In the other component are provided open ended or keyhole slots which are adapted to receive the screw shoulders.

The screws are positioned in the slots by sliding one of the components relative to the other along their plane of separation. Surfaces defining the boundaries of the slots abut with the screw heads to resist separation of the components. Ideally, these abutting surfaces are inclined with respect to the separation plane so that the components are cammed tightly together as they are pushed relative to one another.

Associated with the screw receiving slots is a latch arranged to lock a screw head in its respective slot by snap action when the screw has advanced a sufficient distance into the slot to complete assembly of the components. The latch includes a release tab which may be engaged by a suitable tool and simply pushed to a release position to allow the screw to be removed from its associated slot and permit the components to be disassembled.

DESCRIPTION OF THE PREFERRED EMBODIMENT

Figure 1:
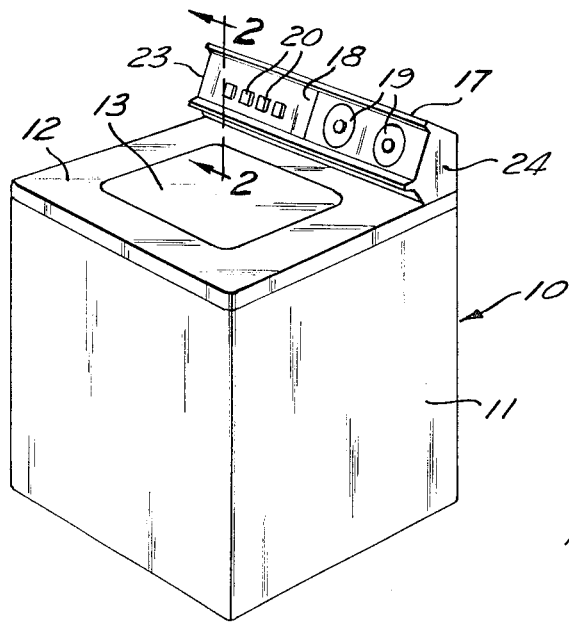
FIG. 1 is a perspective view of a laundry appliance embodying the invention having a lower cabinet base and a seperable upper control console.

Referring now to the drawing, FIG. 1 illustrates a domestic laundry appliance such as a washing machine 10 of generally conventional arrangement except as outlined in the following description. The washing machine 10 includes a cabinet base 11 having a top panel 12 preferably formed of sheet metal. A door 13 in the top panel 12 permits laundry articles to be loaded and unloaded into a basket (not shown) within the cabinet base 11. Mounted on the cabinet top 12 is a control console 17. A front face 18 of the control console includes a plurality of manually operable dials 19 and buttons 20 which are connected to various control elements (not shown) in the control console 17 for determining the various functions of the machine 10.

Figure 2:
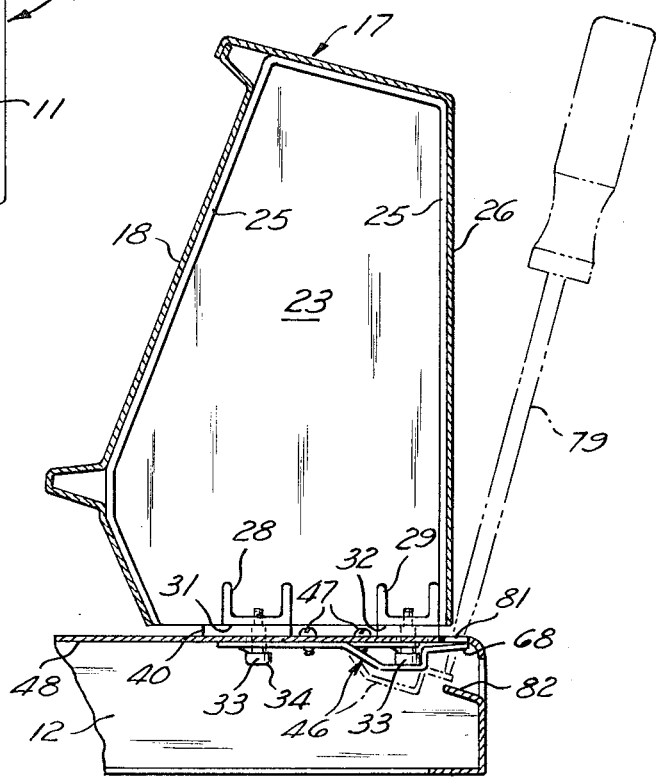
FIG. 2 is a vertical cross-sectional view taken along the line 2—2 indicated in FIG. 1 of an upper part of the cabinet base and one end of the control console.

With particular reference to FIG. 2, the control console 17 includes a panel 23 and 24 at each of its ends. The end panels 23 and 24 are, preferably, formed as metal die castings to provide adequate stiffness and allow edge flanges 25 to be integrally cast thereon. The end panels are provided in left and right hand versions 23 and 24 respectively so that the flanges 25 extend inwardly of the console 17. The front console panel 18 and a rear panel 26 are fastened to these flanges 25 with screws or the like (not shown). The front panel 18 and rear panel 26 cooperate with the end panels 23 and 24 to form elongated box-like structure defining the control console 17.

Figure 5:
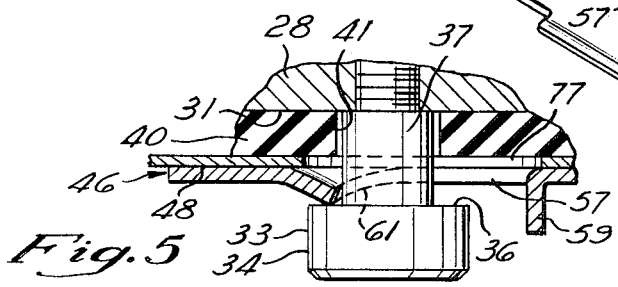
FIG. 5 is a fragmentary cross-sectional view along a plane parallel to but below the plane of the drawing at FIG. 2 and illustrating details of a retaining or open ended slot of the connector bracket.

At a lower side of each end panel 23 and 24 are a pair of inwardly extending integrally cast brackets 28 and 29. The brackets 28 and 29 include lower surfaces 31 and 32 lying in a common plane perpendicular to the plane of the end panel 23 or 24. A pair of identical shoulder screws 33 are threaded into the brackets 28 and 29 from their underside surfaces 31 and 32. As indicated most clearly in FIG. 5, the shoulder screws 33 include a head portion 34 having a radial surface 36 extending parallel to the plane of the bracket surfaces 31 and 32 outwardly from a generally cylindrical shoulder portion 37. Ideally, the shoulder screws 33 are equally spaced from the plane of their associated end panel 23 or 24. A flat pad or sheet 40 of elastomeric or other resilient material is provided under each of the brackets 28 and 29 of each end panel 23 and 24. Each pad 40 is provided with clearance holes 41 somewhat smaller than the screw heads 34 to permit the pads to be loosely retained on the brackets 28 and 29 by the screws 33.

Referring now to structural details at the top panel 12 of the cabinet base 11, identical panel connector brackets 46 at each end of the console 17 are secured by screws 47 to the underside, designated 48, of the top panel. The illustrated connector bracket 46 is conveniently formed as a stamping of spring steel flat stock. The bracket 46 comprises a main body 51 in which are stamped a plurality of holes 52 into which the screws 47 are threaded. At one end of the bracket 46 is a longitudinal slot 56 extending from an enlarged generally circular opening 57 having a diameter larger than the screw heads 34. The slot 56 and opening 57 form a keyhole in the plane of the bracket body 51. A plurality of tabs 59 at the enlarged opening 57 are bent downwardly from the plane of the bracket body 51. As seen most clearly in FIG. 5, lower edges 61 of the open ended slot 56 are inclined gradually away from the plane of the bracket body 51 in a direction to the left or to the front of the machine 10 as viewed in the Figures.

Figure 4:
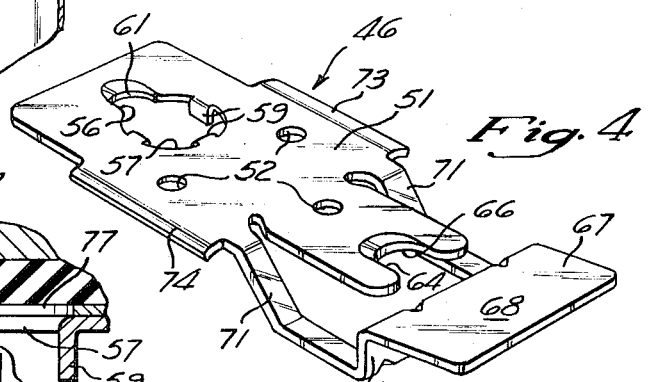
FIG. 4 is a perspective view of an upper side of the connector bracket.

In line with the first slot 56 is a second open ended slot 64 at an opposite end of the bracket body 51. The configuration of this second slot is similar to the keyhole slot 56 and includes an inclined surface or edge 66 (FIG. 4) extending downwardly from the plane of the bracket body 51 in the same manner as the edge 61 of the keyhole slot 56. The spacing between the slots 56 and 64 is substantially equal to the spacing between the screws 33 of each end panel 23 and 24.

Figure 3:
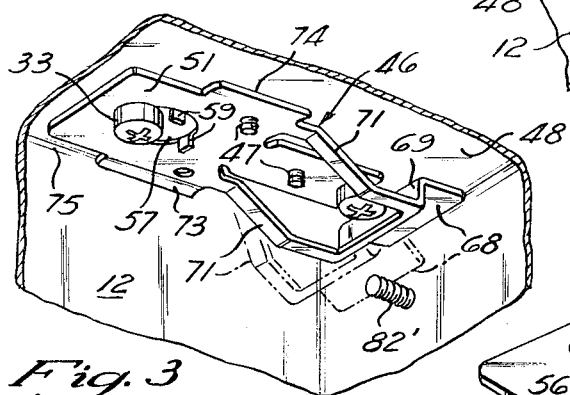
FIG. 3 is a perspective view from the underside of the cabinet base top illustrating a panel connector bracket of the invention.

Integral with the bracket body 51 is a latch 67 adapted to lock one of the screws 33 in the adjacent slot 64. The latch 67 includes a generally vertical surface or edge 69 and a release tab 68. A pair of elongated leaf spring portions 71 extend from a midportion of the bracket body 51 on both sides of the adjacent slot 64 rearwardly to the latch 67. The springs 71 resiliently support the release tab 68 substantially in the plane of the bracket body 51. Longitudinal edges 73 and 74 of the bracket 46 are bent slightly downward. As shown in FIG. 3, the bent edge portion 73 at one side provides clearance with an inside corner 75 of the top panel. The opposite bent edge portion 74 of another bracket at the opposite end of the console 17 provides similar clearance.

Suitable holes (not shown) are provided in the top panel 12 for the bracket mounting screws 47. Similarly, clearance holes are provided in the top panel 12 in line with the keyhole slot 56 and the open ended slot 64. The hole associated with the keyhole slot 56 is indicated at 77 in FIG. 5.

As may be appreciated from the foregoing description, prior to assembly of the control console 17 on the cabinet base top 12 the shoulder screws 33, assembled through the holes 41 in the resilient pads 40, are tightened into the side panel brackets 28 and 29 at both ends of the console. Likewise, at opposite sides of the top panel, the connector brackets 46 are mounted by the screws 47. The console 17 is then assembled on the cabinet base top 12 by dropping the projecting heads 34 of the shoulder screws 33 through the top panel into the areas adjacent the open ended slots 56 and 64. At each end of the console 17, this motion causes the screws 33 to deflect the associated latches 67 downwardly by engagement of the heads 34 with the tab portions 68.

One end of the control console 17 is then forced forwardly relative to the cabinet base along the horizontal plane defined by the top panel 12 so that the screw shoulders 37 enter the respective slots 56 and 64. Upon this forward movement the inclined slot edges 61 and 66, gripped by the radial surfaces 36, cam the shoulder screws 33 downwardly. This downward camming movement draws the side panel brackets 28 and 29 into tight engagement with the associated resilient pad 40 to insure that the control console 17 will be rigidly mounted on the top panel 12.

When the screws 33 are pushed a sufficient distance into the associated slots 56 and 64 the latch 67 snaps upwardly to its normal position. The vertical latch surface 69 captures the adjacent screw head 34 to prevent the screws 33 from moving rearwardly out of their respective slots 56 and 64. A similar procedure is followed at the other end of the control console 17 to complete the installation. From the foregoing, it may be appreciated that the control console 17 may be completely installed with a minimum of manual effort and without the use of tools or loose fasteners.

The control console 17 may be removed from the top cabinet 12 for service by depressing the release tab 68 downwardly with an appropriate tool 79, such as a screwdriver, indicated in phantom in FIG. 2. An access hole 81 is provided at each side of the top panel 12 through which the tool 79 may be inserted. With the screw 33 released in this manner, a slight rearward force may be applied to the associated end of the console 17 to move the screws 33 rearwardly out of the slots 56 and 64. The bracket tabs 59 prevent the screw head 34 from catching on the edges of the circular opening 57 during removal. After this operation is repeated at the opposite end of the control console 17, the console may be lifted off of the cabinet base top 12. As illustrated in FIG. 2, a stop tab 82 may be partially punched out of the top panel 12 to limit downward movement of the latch 67. Alternatively, a screw 82' as illustrated in FIG. 3 may be provided for the same purpose. The tab 68 of the latch 67 is adapted to substantially close the access hole 81.

Although a preferred embodiment of this invention is illustrated in detail, it is to be understood that various modifications and rearrangements of parts may be resorted to without departing from the scope of the invention disclosed herein. For example, where desired the structure of the connector bracket 46 may be provided integrally in the top panel 12. Parts may be inverted so that the shoulder screws 33 or equivalent elements are arranged on the top panel while cooperating slots or their equivalents are arranged on the control console 17 to achieve substantially the same results as the disclosed embodiment.

What is claimed is:

1. In a laundry appliance having as components a cabinet base and a control console separable across a horizontal plane, means for releasably connecting the console to the base comprising gripping means extending from one component across the plane of separation to the other component, cooperating means on said other component engageable with said gripping means to resist forces perpendicular to said separation plane, self-locking means operable in response to relative movement between it and said one component in a horizontal direction to prevent disengagement between said gripping means and said cooperating means, means for releasing said self-locking means, said self-locking means being enclosed by said components when connected, and an access hole in one of said components adjacent said release means whereby said self-locking means may be released by mechanical manipulation of said release means by operations conducted through said hole.

2. An appliance as set forth in claim 1 wherein said locking means is fixed on the other of said components and the other component is movable relative to said one component to provide relative movement between said locking means and said one component.

3. An appliance as set forth in claim 1 wherein said locking means includes latching means movable between a latching position and a release position in a direction perpendicular to the direction of relative movement between the locking means and said one component, said releasing means including a tab extending horizontally into confronting relationship with said access hole whereby said tab may be displaced by a tool extending through said access hole.

4. A bracket for connecting two members at a plane separating them comprising a generally planar bracket body, a pair of longitudinally aligned open ended slots in the body, a latch including a surface portion extending generally perpendicular to the plane of the bracket body, said surface portion being spaced a predetermined distance from the end of one slot, and spring means resiliently biasing the latch to a latching position where said latching surface portion is adjacent said plane, said slots including inclined cam surfaces along their horizontal edges, said cam surfaces increasing in distance from the plane of the body with increasing distance from the open end of their associated slots, said spring means comprising a pair of cantilevered spring legs extending, one on each side of the bracket body, from the bracket body at points on the body between said slots, said body, latch, and spring means being integrally formed of sheet metal stock and said latch including a release tab extending generally perpendicular to the latching surface portion, said release tab being integral with said latching surface portion and being formed by bending at right angles to said latching surface portion such that it extends laterally from the latching surface portion a distance substantially greater than the thickness of the body sheet stock.

5. A bracket as set forth in claim 4 wherein said release tab is biased to a position in the plane of said body by said spring means.

6. A bracket as set forth in claim 5 wherein the other of said open ended slots is formed by a keyhole in said body, and means associated with said keyhole to prevent a headed mating member slidable in the associated slot from catching on the edges of the keyhole during removal of said mating member.

7. A laundry appliance having as components a cabinet base and a control console, means for releasably mounting the console on the cabinet base, said mounting means including a plurality of headed members extending from a first of said components to the second, slot means fixed on the second component for releasably retaining the heads of said members when the heads are moved horizontally into the slot means by relative motion between said components, and a self-operating latch fixed on one of said components responsive to movement of said heads into slots to prevent disengagement of said heads from said slots after the heads have reached a predetermined position in the slots.

8. A bracket as set forth in claim 4 including means for fastening said bracket to one of said members prior to assembly of said members.

9. A laundry appliance having separable components, including a cabinet base and a control console, means for releasably connecting the control console to a sheet metal top panel of the cabinet base, said connecting means including a pair of spaced headed elements fixed to one of said components and extending across the horizontal plane defined by the cabinet top panel, a pair of longitudinally aligned spaced slots fixed relative to the other component, said headed elements being receivable into said slots by vertical movement of said headed elements into said slots, said slots and said other component being arranged to permit longitudinal movement of said headed elements therein from a rearward separable position to a forward mutually engaged position at which forces perpendicular to said horizontal plane are resisted by interaction between said headed elements and said slots, and a latch responsive to movement of said headed elements into said forward position to grip a portion of one of said headed elements and prevent unintentional rearward movement of said headed elements, said latch including a surface vertically movable into the longitudinal path of said one headed element to grip said portion, and a surface normally extending laterally of said portion in a horizontal plane, said connecting means being substantially enclosed by said components when connected, one of said components including an access hole immediately adjacent said horizontal surface whereby said horizontal surface may be readily engaged for release by a tool extending through said access hole.

10. An appliance as set forth in claim 9, wherein said lateral horizontal surface substantially closes said access hole.

* * * * *